(12) United States Patent
Harris

(10) Patent No.: US 10,248,206 B2
(45) Date of Patent: Apr. 2, 2019

(54) SYSTEMS AND METHODS FOR MULTIMEDIA TACTILE AUGMENTATION

(71) Applicant: Ralph Alan Harris, Houston, TX (US)

(72) Inventor: Ralph Alan Harris, Houston, TX (US)

(73) Assignee: XSYNC TECHNOLOGIES LLC, Houston, TX (US)

( * ) Notice: Subject to any disclaimer, the term of this patent is extended or adjusted under 35 U.S.C. 154(b) by 256 days.

(21) Appl. No.: 15/074,754

(22) Filed: Mar. 18, 2016

(65) Prior Publication Data

US 2016/0274666 A1    Sep. 22, 2016

Related U.S. Application Data

(63) Continuation-in-part of application No. 14/295,471, filed on Jun. 4, 2014, now Pat. No. 9,703,379.

(60) Provisional application No. 62/135,204, filed on Mar. 19, 2015, provisional application No. 61/868,039, filed on Aug. 20, 2013.

(51) Int. Cl.
  *A61F 5/00* (2006.01)
  *G06F 3/01* (2006.01)
  *H04L 29/06* (2006.01)
  *G06F 3/16* (2006.01)

(52) U.S. Cl.
  CPC .......... *G06F 3/016* (2013.01); *G06F 3/167* (2013.01); *H04L 65/4015* (2013.01); *H04L 65/605* (2013.01); *H04L 67/38* (2013.01)

(58) Field of Classification Search
  CPC .......... A61H 19/30; A61H 19/00; G06F 3/016

USPC .................................. 600/38–41; 340/407.1
See application file for complete search history.

(56) References Cited

U.S. PATENT DOCUMENTS

| | | | |
|---|---|---|---|
| 6,368,268 B1 | 4/2002 | Sandvick et al. | |
| 6,700,936 B1 | 3/2004 | Moss | |
| 8,378,794 B2 | 2/2013 | Alarcon | |
| 8,909,817 B2 | 12/2014 | Cruz-Hernandez et al. | |
| 9,064,385 B2 | 6/2015 | Saboune et al. | |
| 2002/0138562 A1 | 9/2002 | Wies et al. | |
| 2008/0223627 A1 | 9/2008 | Lacroix et al. | |
| 2012/0296453 A1* | 11/2012 | Prentice | G01S 5/14 700/91 |
| 2012/0304216 A1 | 11/2012 | Strong | |
| 2015/0057493 A1* | 2/2015 | Harris, Jr. | G06F 3/016 600/38 |

FOREIGN PATENT DOCUMENTS

| | | |
|---|---|---|
| CN | 102184419 B | 5/2013 |
| WO | 2013096327 | 6/2013 |

* cited by examiner

*Primary Examiner* — John Lacyk
(74) *Attorney, Agent, or Firm* — Hahn Loeser & Parks, LLP

(57) ABSTRACT

A media appliance for multimedia augmentation is described. The media appliance includes a processor and a memory storing an application. The media appliance being connectable to a display device to enable playback of content and one or more hardware devices to provide augmentation of the content. The media appliance synchronizes content playback with execution of instructions for the one or more hardware devices.

14 Claims, 15 Drawing Sheets

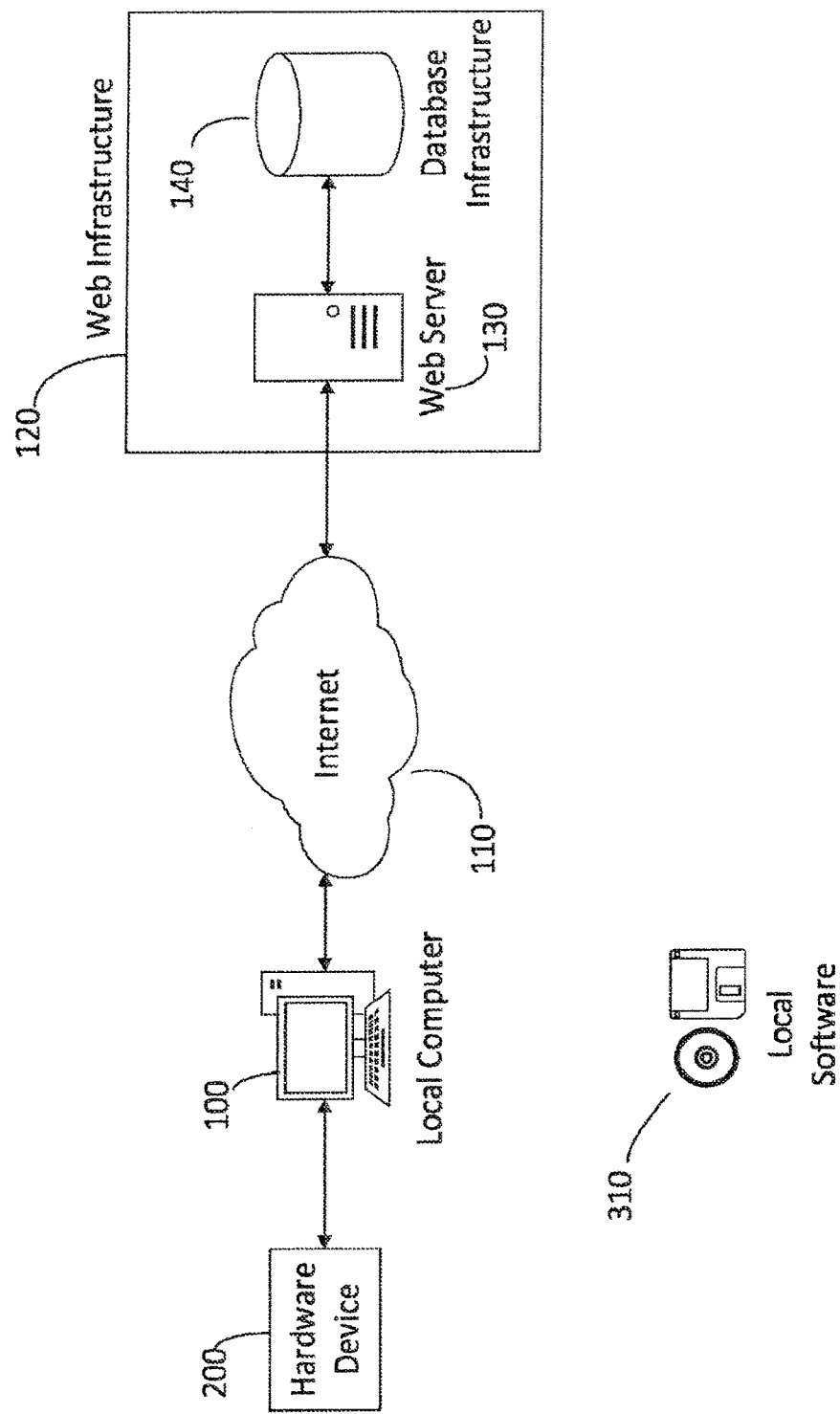

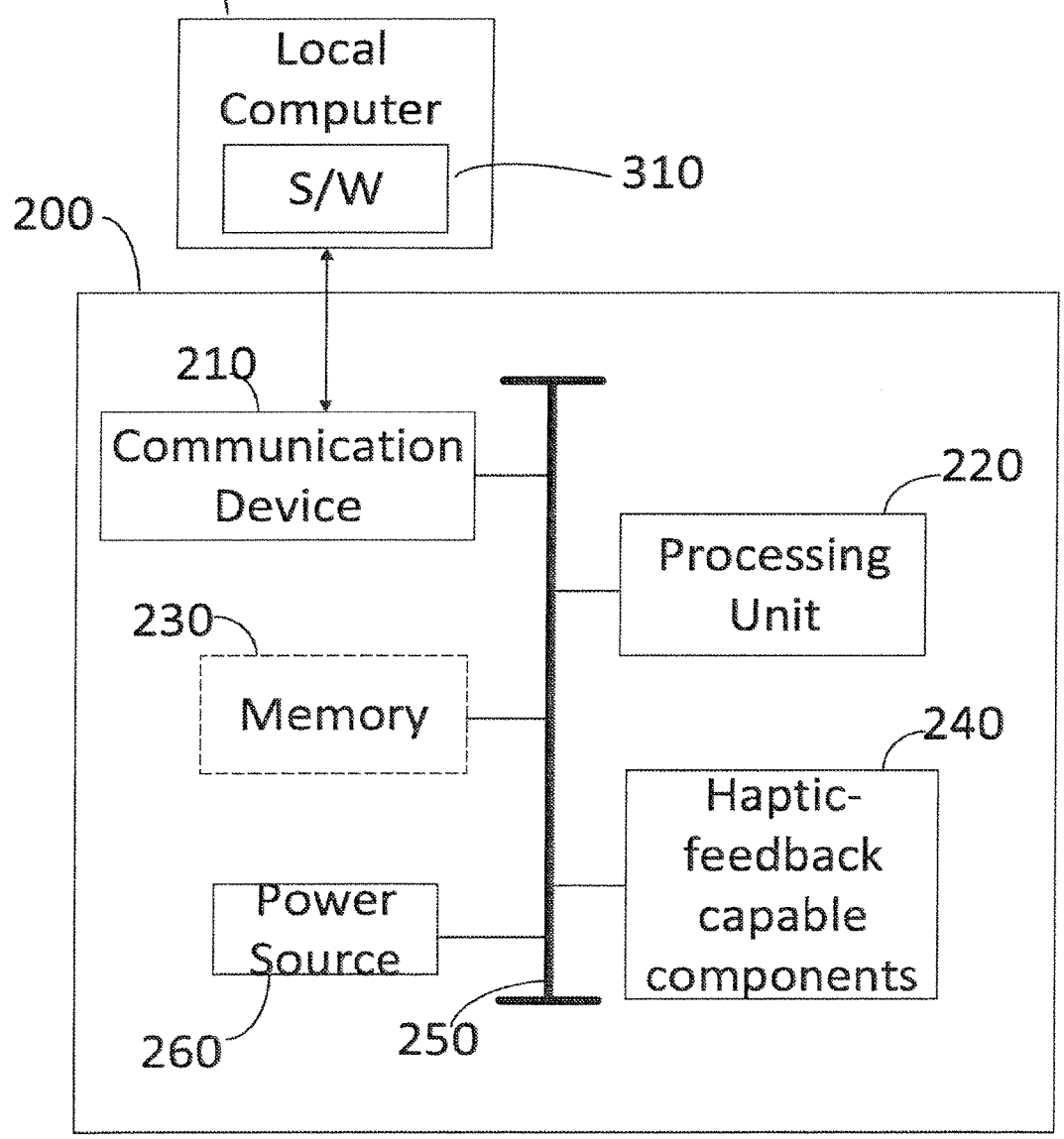

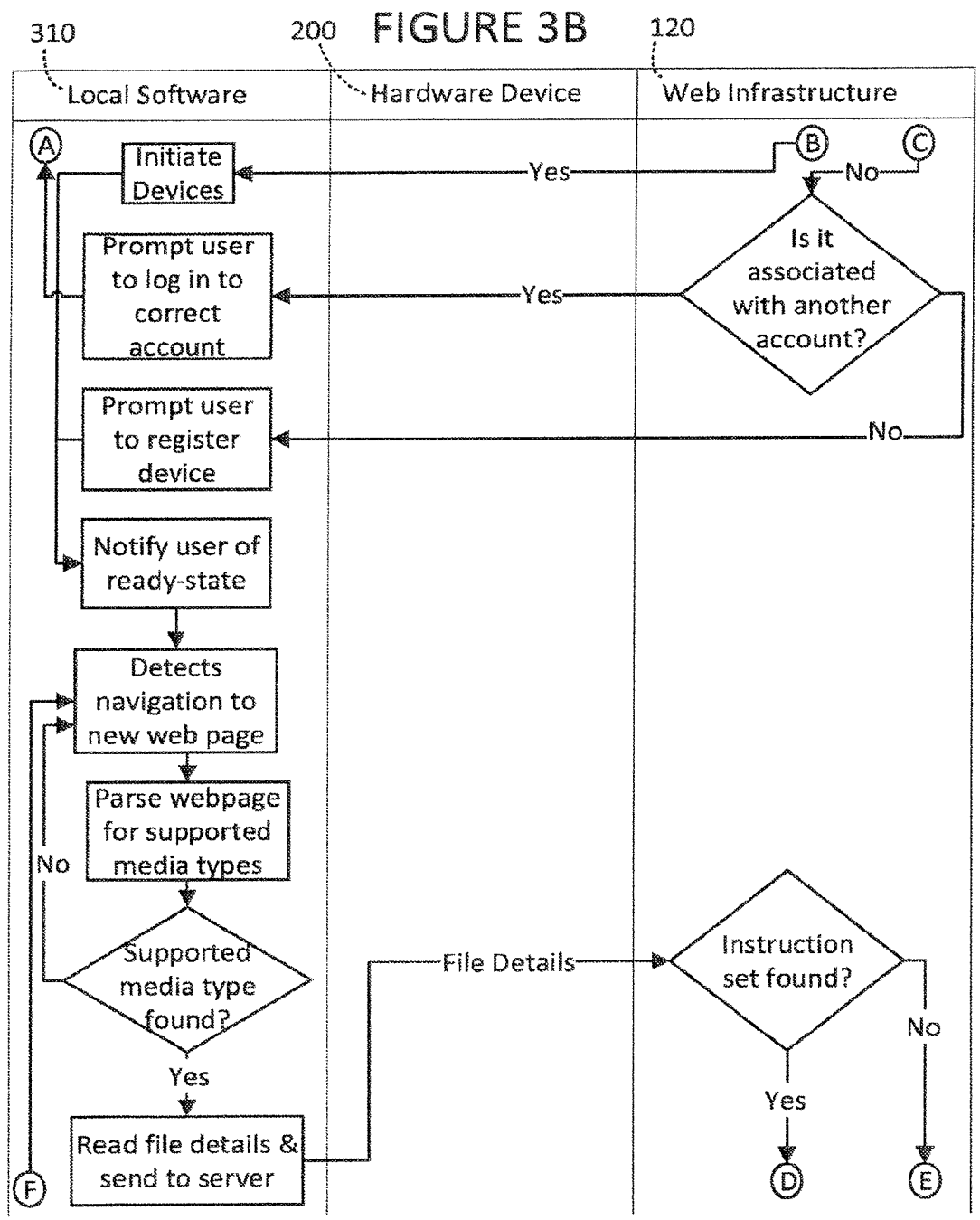

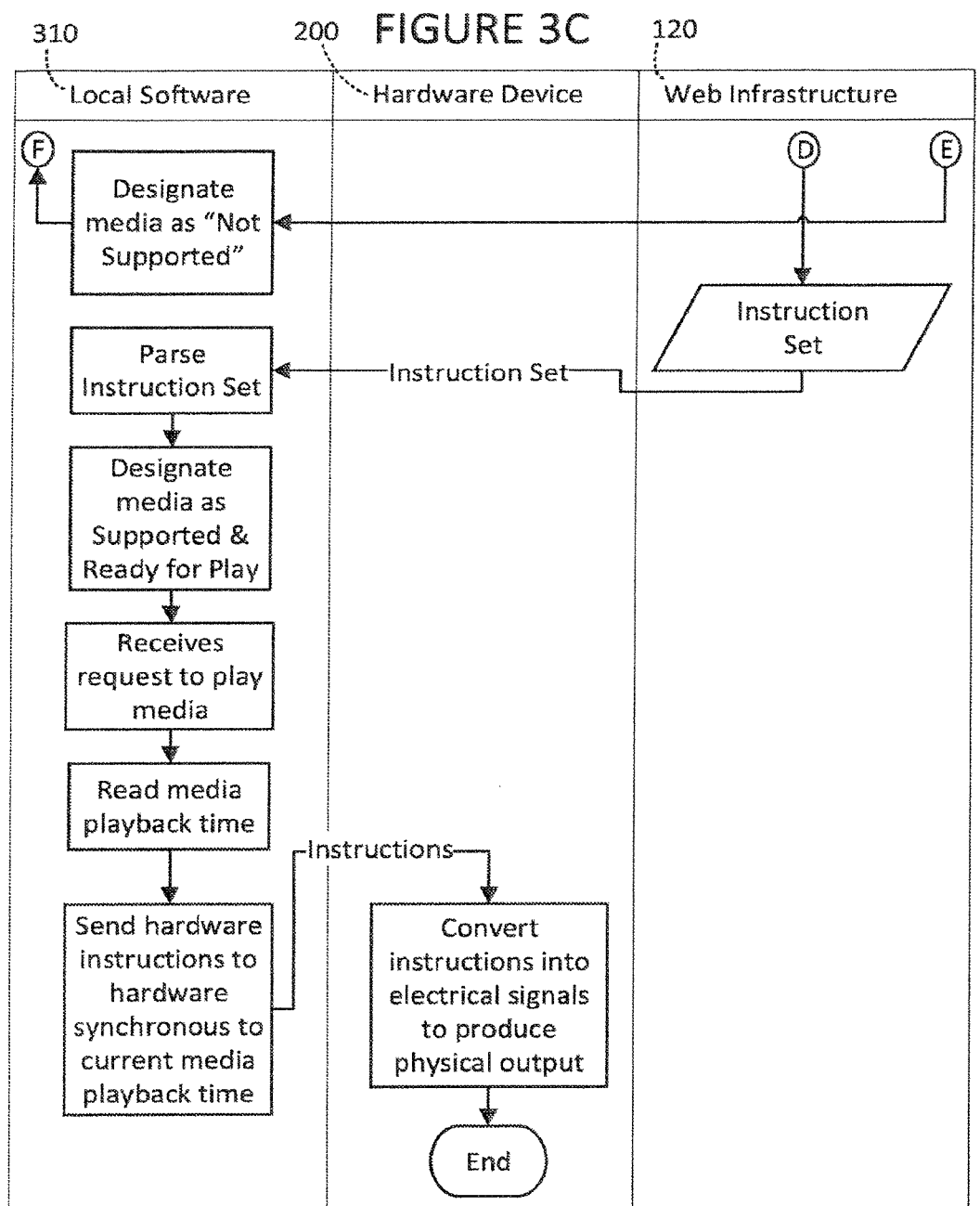

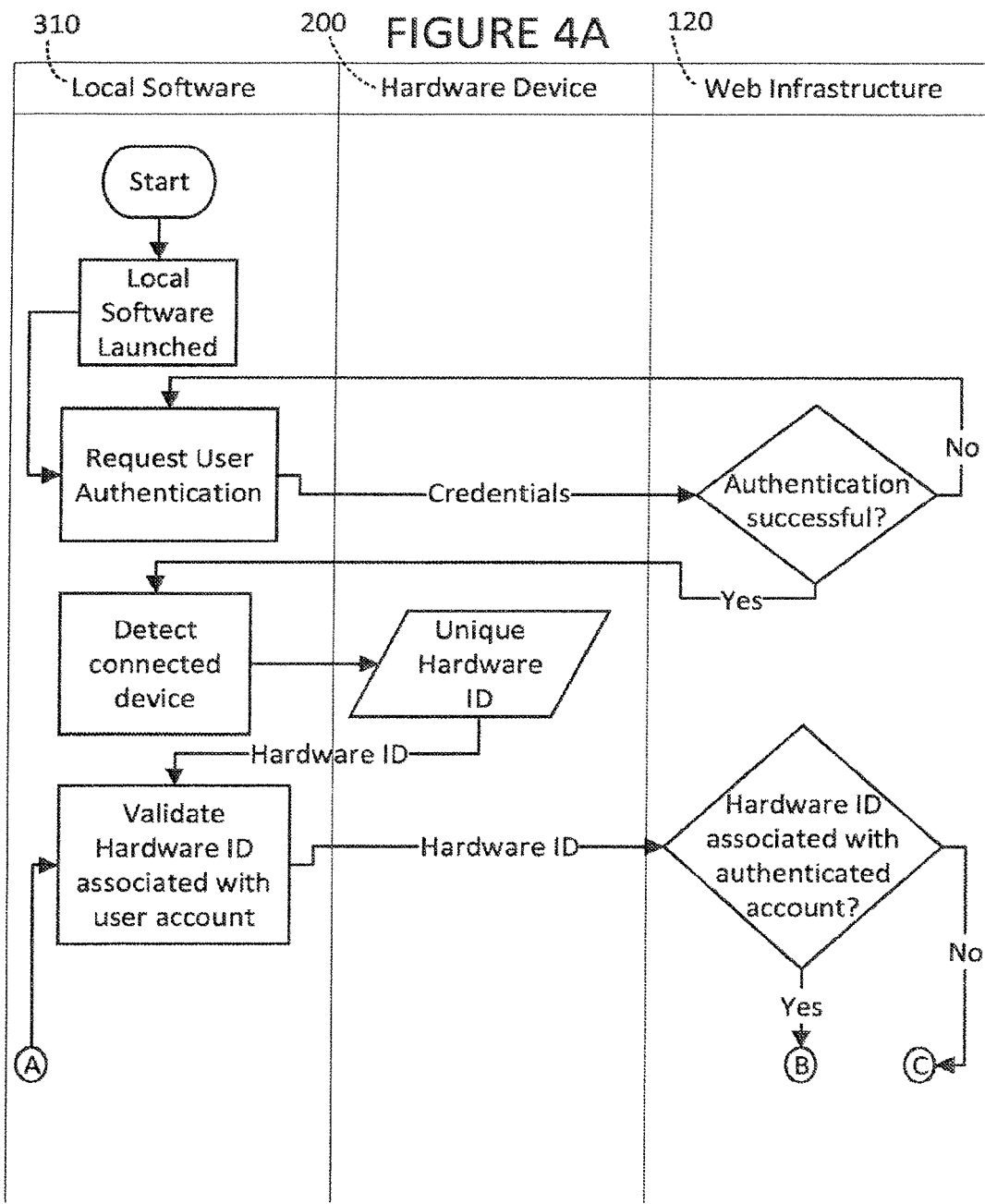

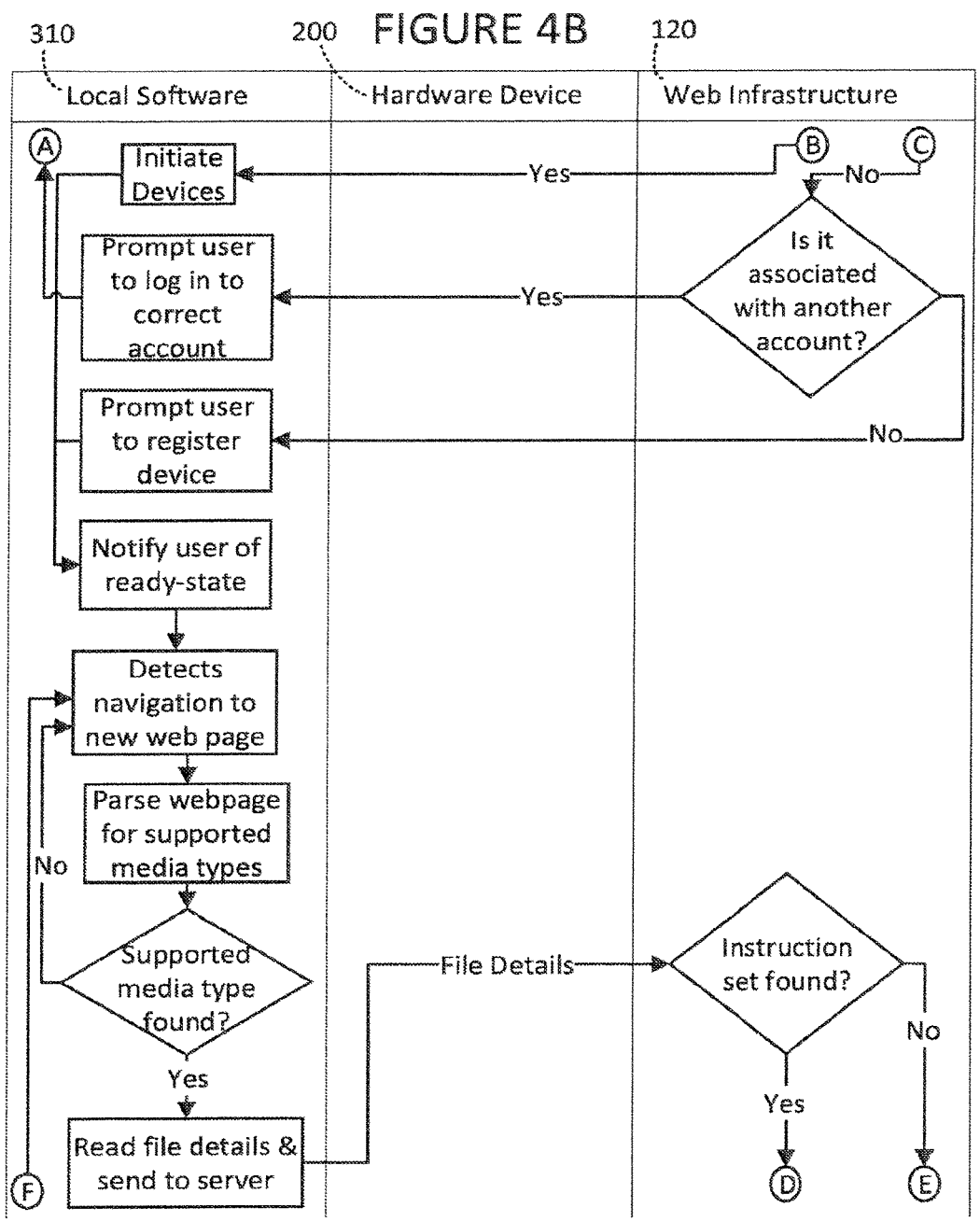

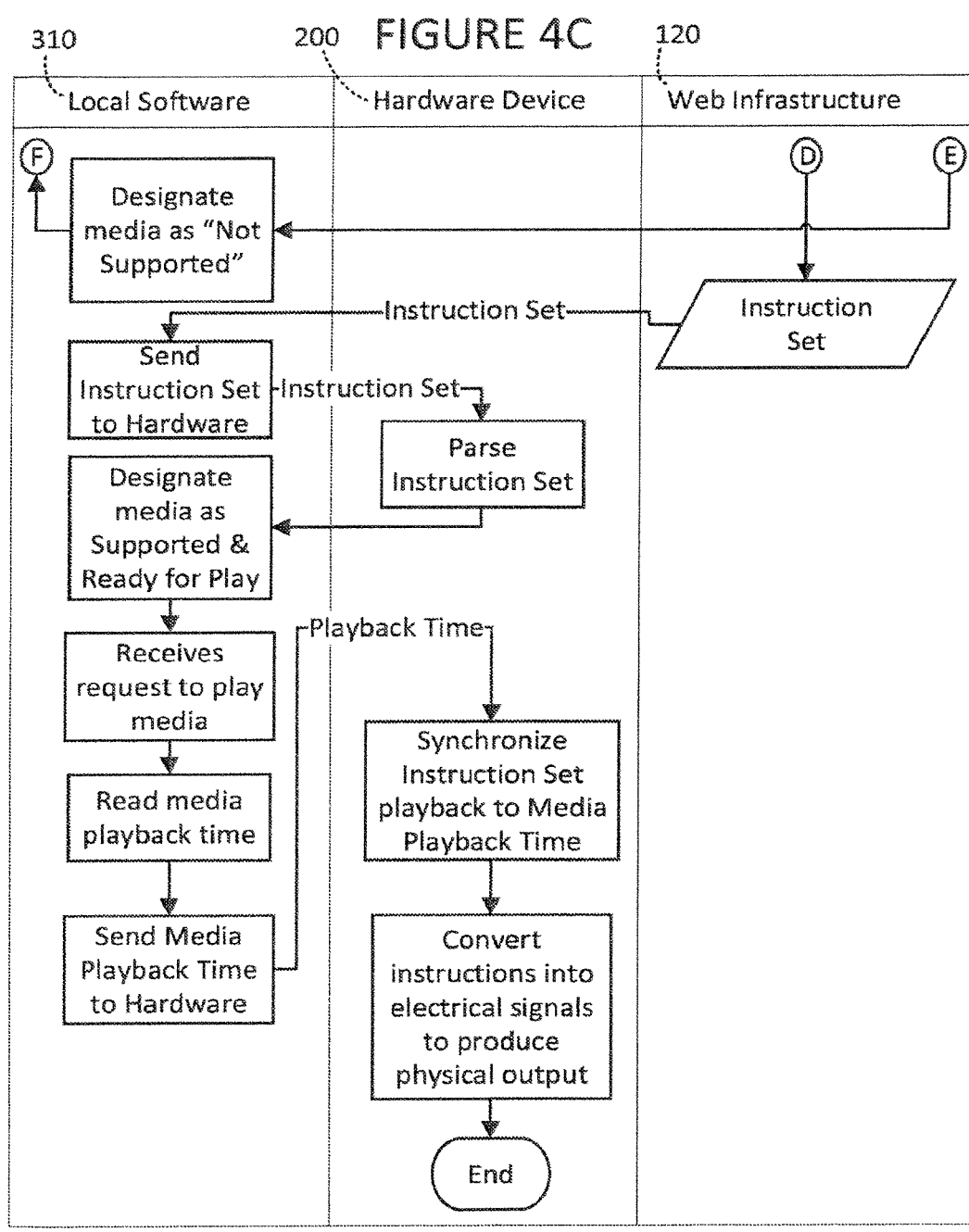

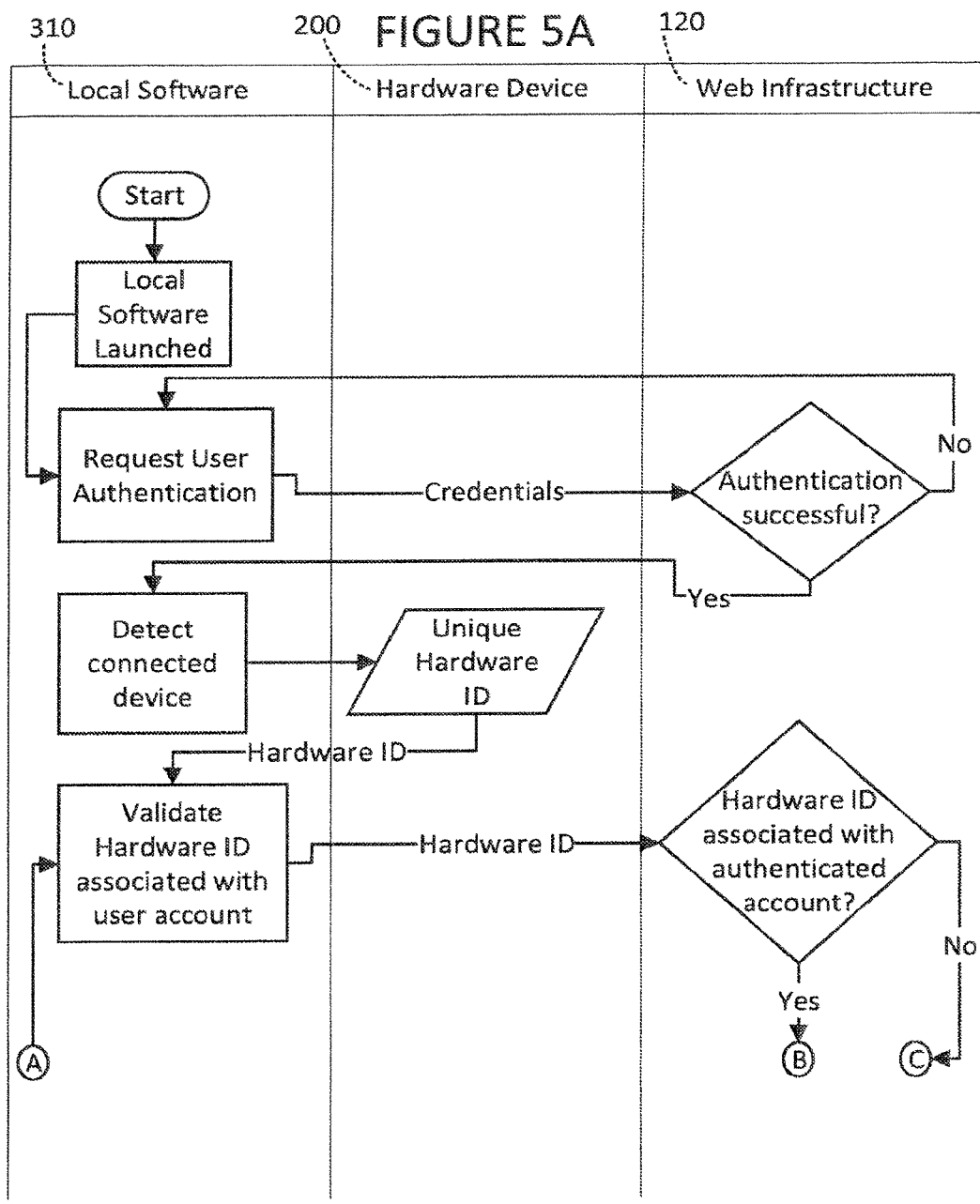

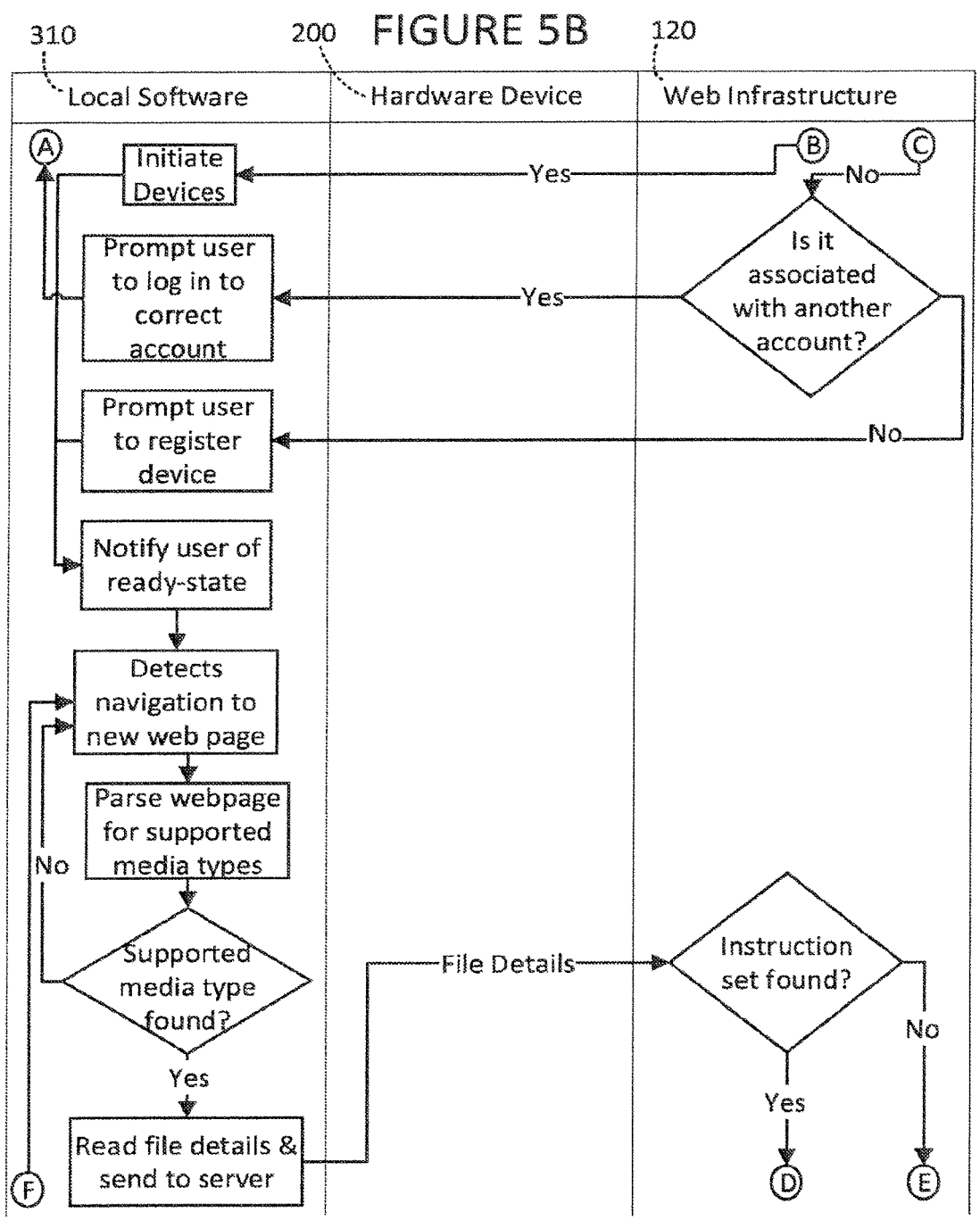

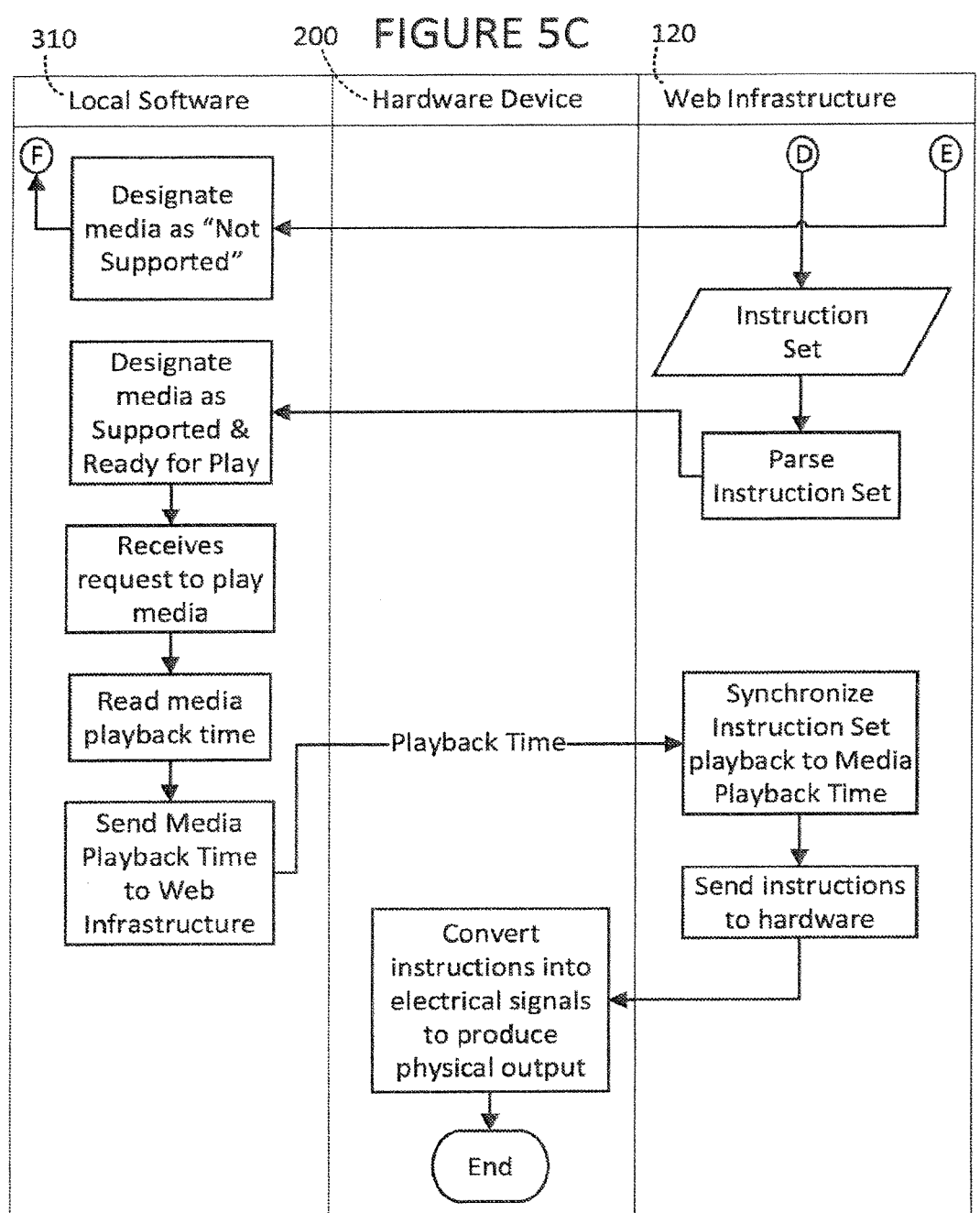

SYSTEMS AND METHODS FOR MULTIMEDIA TACTILE AUGMENTATION

This application claims the benefit of priority from and incorporates by reference into this application as if fully set forth herein the disclosures of provisional application Ser. No. 62/135,204, filed Mar. 19, 2015; and currently pending patent application Ser. No. 14/295,471, filed 4 Jun. 2014, which claims priority from provisional patent application Ser. No. 61/868,039, filed 20 Aug. 2013.

BACKGROUND AND SUMMARY

The present disclosure relates to systems and methods for augmenting multimedia experiences with tactile sensations.

The computing industry has trended towards the convergence of online content and hardware-connected components since the inception of the World Wide Web. Only recently, however, has this trend begun to include haptic devices. As of the writing of this patent, a number of inventions have been disclosed that address the intersection between multimedia and locally-connected hardware devices. For example, U.S. Pat. No. 6,368,268 to Hassex, Inc. ("Hassex") shows an invention that is capable of synchronizing sensations between a user interface and a sexually-oriented hardware-connected device.

Various User Interfaces exist, including: a sexually-oriented hardware device receiving uni-directional control signals from a hand-operated controller, such as a joystick; two sexually-oriented hardware devices, both of which send simultaneous, bi-directional control signals based on real-time usage; and a server that sends control signals directly to a remote software interface, which sends the control signal to the sexually-oriented hardware device. For example, Hassex specifies that the control signal, which is received via a data packet, is first decoded by the user interface then sent through the I/O port of the computer to the locally-connected, sexually-oriented hardware device.

Similarly, U.S. Pat. No. 8,378,794 to Internet Services, LLC ("Inet Svcs") describes a hardware component and its interactions with multimedia files that are associated with hardware control signals. The hardware device generates sensations in response to the hardware control signals via a belt system. The RealTouch™ device described by Inet Svcs uses a static Web portal to serve users multimedia files containing embedded hardware control signals. A user's computer receiving the files includes a software add-on for Windows Media Player that decodes the control signals. Once the software add-on is installed and the multimedia file is downloaded, Windows Media Player simultaneously plays the multimedia file and decrypts, then plays the associated hardware control signals directly from the user's computer.

Presently disclosed is a method for multimedia tactile augmentation. In embodiments, the method includes identifying media content loaded on a first computer; locating instructions stored on a second computer, said instructions corresponding to the content; initiating playback of the content; synchronizing the instructions with the content; parsing and converting the instructions into one or more electrical signals; driving one or more haptic feedback devices with the electrical signals in synchronization with the playback of the content, said haptic feedback devices providing physical stimulation to a user accessing the content; and presenting the content to the user.

In some embodiments, the parsing and synchronizing are performed by the first computer and the converting is performed by a processing unit coupled to the haptic feedback devices.

In some embodiments, the parsing, synchronizing and converting are performed by a processing unit coupled to the haptic feedback devices.

In some embodiments, the parsing and synchronizing are performed by the second computer and the converting is performed by a processing unit coupled to the haptic feedback devices.

In some embodiments, the method further includes the second computer providing access to the instructions via the Internet through a web interface presented on the first computer.

In some embodiments, the method further includes the content with computer vision to determine a playback time of the content and synchronizing the instructions with the content based on the determined playback time.

Also disclosed is a method for multimedia tactile augmentation that includes identifying media content within a first file loaded on a computer; locating instructions within a second file loaded on the computer, said instructions corresponding to the content; initiating playback of the content; synchronizing the instructions with the content; parsing and converting the instructions into one or more electrical signals; driving one or more haptic feedback devices with the electrical signals in synchronization with the playback of the content, said haptic feedback devices providing physical stimulation to a user accessing the content; and presenting the content to the user.

Also disclosed is a haptic feedback system. The haptic feedback system includes a processor coupled to a memory, the processor configured to execute the following computer-executable instructions stored in the memory: synchronizing media content loaded on a first computer with instructions received from a second computer, said instructions corresponding to the media content, and converting the instructions into one or more electrical signals; and at least one haptic feedback device in communication with the processor, wherein the at least one haptic feedback device is configured to receive the one or more electrical signals and to provide physical stimulations to a user accessing the content in synchronization with the playback of the media content.

In some embodiments, the haptic feedback system further includes a presentation device adapted to present the media content to the user.

In some embodiments, the at least one haptic feedback device is further configured to communicate wirelessly with the processor.

In some embodiments, the at least one haptic feedback device further comprises at least one communication device selected from the group consisting of a serial port, a parallel port, a universal serial bus, a BlueTooth device, a near field communication device, and an infrared communication device.

In some embodiments, the at least one haptic feedback device is a game controller adapted for use with an online video game system.

In some embodiments, wherein the at least one haptic feedback device is a sexually oriented hardware device.

BRIEF DESCRIPTION OF THE DRAWINGS

A better understanding of the various disclosed embodiments can be obtained when the following detailed description is considered in conjunction with the attached drawings, in which:

FIG. 1 shows a system diagram that includes an illustrative Web Infrastructure.

FIG. 2 shows a block diagram of a Local Hardware Device.

FIGS. 3A-3C show a software flowchart and functional distribution for a first illustrative embodiment.

FIGS. 4A-4C show a software flowchart and functional distribution for a second illustrative embodiment.

FIGS. 5A-5C show a software flowchart and functional distribution for a third illustrative embodiment.

Figure 3A:
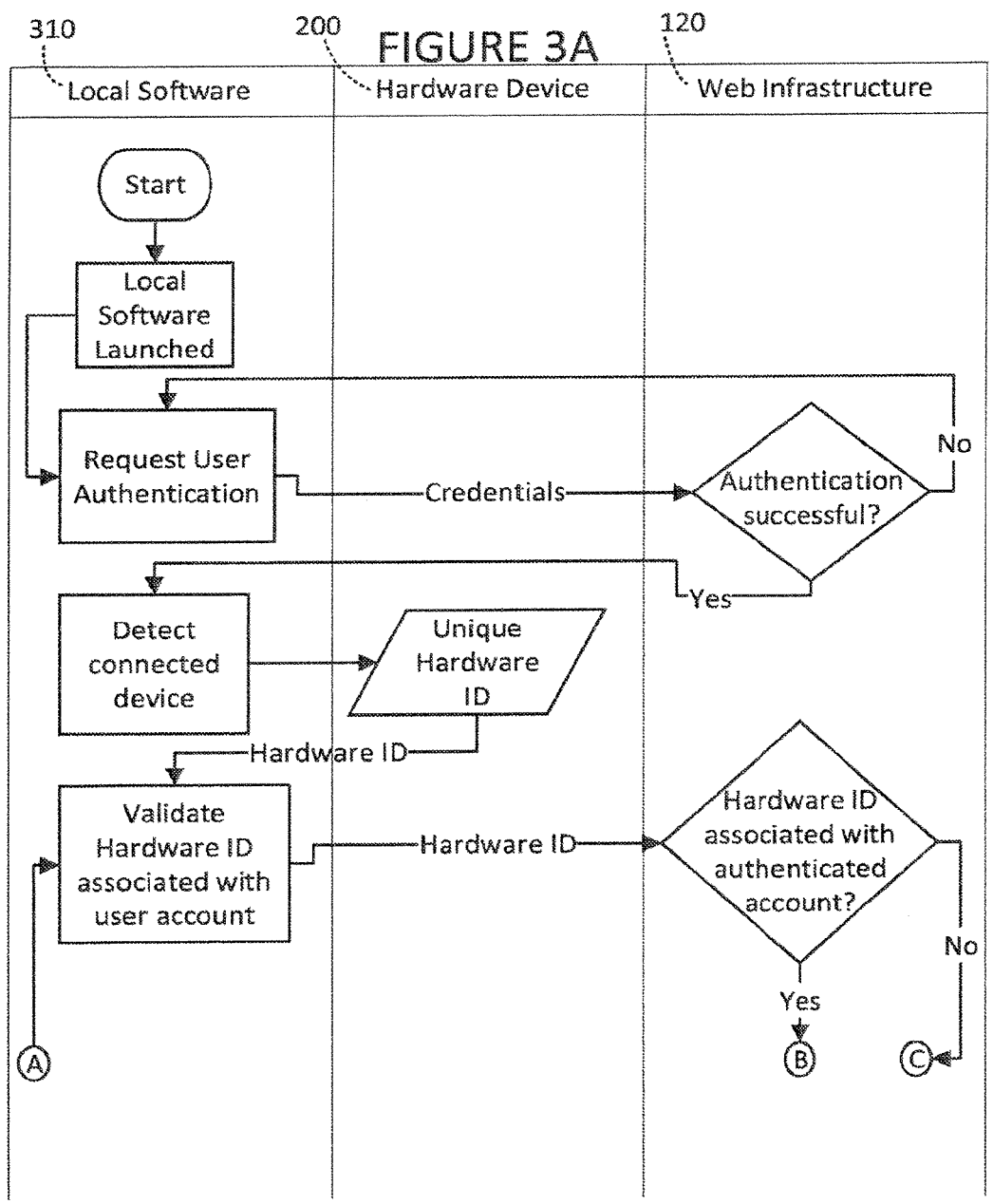

It should be understood that the drawings and corresponding detailed description do not limit the disclosure, but on the contrary, they provide the foundation for understanding all modifications, equivalents, and alternatives falling within the scope of the appended claims.

DETAILED DESCRIPTION

The disclosed embodiments relate to the synchronization of locally-connected hardware components to online, web-based multimedia events such as online movies, interactive video games, entertainment media and/or other non-entertainment media. More specifically, the disclosed embodiments relate to software and systems executing the software that create the user-experienced haptic synchronization effect between various online video sources and locally-connected haptic hardware components. The disclosed embodiments rely on a client-server architecture to maintain synchronization between locally-connected haptic hardware and online multimedia events. These embodiments synchronize two separate data sources: online multimedia being served from a content provider's website, such as YouTube, Netflix, or Amazon Instant Video; and haptic hardware instructions associated with said multimedia and hardware device being served by a web infrastructure configured to support said embodiments. In contrast to prior systems, the separation of the multimedia content and the haptic hardware instructions improves the utility of the presently disclosed systems and methods by enabling rapid deployment of instructions for new media content and new haptic hardware. In this manner, media content may be synchronized with haptic hardware instructions for both pre-existing devices as well as new devices without modification or alternation of the media content. This flexibility and scalability was not possible with prior systems, such as those discussed above, in which hardware control signals were embedded directly in multimedia files.

The paragraphs that follow describe in detail various examples of the above-described embodiments. An example of local software executing on a user's local client computer system is first described, followed by a description of an illustrative Web infrastructure and a description of an illustrative local hardware device. Three illustrative embodiments are then described, wherein the multimedia event's hardware instruction set is interpreted by a different component for each embodiment (i.e., the local client computer, the local hardware device and the Web infrastructure).

Web Infrastructure

FIG. 1 shows an overview of an illustrative embodiment of a multimedia tactile augmentation system that includes the Web Infrastructure 120, an Internet 110 infrastructure with one or more Web Server 130 and Database Infrastructure 140. In the embodiment shown, a Web Server 130 responds to requests from the Local Software 310 executing on Local Computer 100 or from the Local Hardware Device 200, and further queries the Database Infrastructure 140 as needed. Local Software 310 may be stored on non-volatile information storage medium as shown, or may be downloaded onto the Local Computer 100 via, e.g., the Internet 110.

The core functionalities of the Web Infrastructure 120 include, but are not limited to:
1. Responding to requests from the Local Software 310 or Local Hardware Device 200;
2. Maintaining User account information; and
3. Hosting any web sites required to support the disclosed system.

Local Hardware Device

FIG. 2 shows a preferred embodiment of the Local Hardware Device 200 that includes a Communication Device 210, a Processing Unit 220, one or more Haptic Feedback Capable Components 240, such as vibration motors, a Power Source 260, such as a battery or a port for electrical port connectivity, and a Bus 250 which is used to transport communications between each of the Local Hardware Device's 200 components. The Local Hardware Device 200 may exist in any shape or size, with the distinguishing factor being that it is designed to work with the disclosed system. In at least some illustrative embodiments, multiple Local Hardware Devices 200 are coupled to local computer 100 and are simultaneously operable. In at least some illustrative embodiments, the Haptic Feedback Capable components 240 of local hardware device 200 provide physical and/or sexual stimulation to one or more users of the disclosed system(s).

The core functionalities of the Local Hardware Device 200 may include, but are not limited to:
1. Establishing connectivity to the personal computing environment via the Communication Device 210; examples of the Communication Device 210 include, but are not limited to:
   a. Serial and parallel ports, Universal Serial Bus (USB), BlueTooth, Near Field Communications (NFC) or other wireless technologies;
2. Establishing connectivity to the Local Software 310 or Web Infrastructure 120;
3. Responding to requests for identifying information;
4. Interacting with instructions:
   a. The Processing Unit 220 may receive instructions via the Web Infrastructure 120 or the Local Software 310; and
   b. The instructions may be processed before the Processing Unit 220 receives them;
      i. If the instructions are not processed before the Processing Unit 220 receives them, the Processing Unit 220 may process the instructions, possibly including the temporary storage of processed instructions in the Locally Connected Hardware's 200 Memory 230; and
5. Interacting with the Haptic Feedback Capable Components 240:
   a. The processing unit commands each Haptic Feedback Capable Component 240 to respond for specific durations and in specific patterns based on the instructions, with the end result being synchronization between the Local Hardware Device's 200 Haptic Feedback Capable Components 240 and the online multimedia event.

Local Software

In at least some illustrative embodiments, Local Software 310 executes on a Local Computer 100 in the form of a browser extension or add-on. This enables the Local Software 310 to enhance an existing web browser such as, e.g., Microsoft Internet Explorer, Google Chrome or Mozilla Firefox by adding the functionalities of the Local Software 310 to the existing web browser.

The core functionalities of the Local Software 310 include, but are not limited to:

1. Establishing and maintaining connectivity to and interactivity with the Web Infrastructure 120:
   a. Facilitating User authentication to the Web Infrastructure 120;
   b. Facilitating User authentication for multiple accounts simultaneously;
   c. Sending identifying information about multimedia to the Web Infrastructure 120 to determine if the detected multimedia has an associated hardware instruction set; if the associated hardware instruction set exists, designating the multimedia as supported;
   d. Retrieving associated hardware instruction sets;
2. Interacting with the Local Hardware Device 200:
   a. Establish and maintain connectivity to the Local Hardware Device 200;
   b. Retrieve identifying information about the Local Hardware Device 200;
   c. Determine if the Local Hardware Device 200 is associated with the authenticated User's account; if not, facilitate account interactions with the Web Infrastructure 120 to associate the Local Hardware Device 200 with the User's account, or facilitate authentication to the correct account to permit usage of the Local Hardware Device 200;
   d. Sending instructions to the Local Hardware Device 200;
   e. Monitoring playback of Local Hardware Device 200 as needed to maintain synchronization between Local Hardware Device 200 and multimedia event;
3. Interacting with web pages:
   a. Parsing webpages to detect multimedia;
   b. Detecting identifying information about the multimedia;
   c. Manipulating the displayed web page to label discovered multimedia as supported or not, based on feedback from the Web Infrastructure 120;
   d. Manipulating the multimedia player to facilitate interaction with multimedia;
4. Interacting with multimedia on web pages:
   a. Controlling the playback of multimedia to facilitate synchronization between the Local Hardware Device 200 and the multimedia; and
   b. Identifying and controlling the current playback time of multimedia to facilitate synchronization between the Local Hardware Device 200 and the multimedia.
   c. Analyzing the multimedia content with computer vision to determine a playback time of the multimedia content and synchronizing the instructions for the Local Hardware Device 200 with the multimedia content based on the determined playback time.

Alternate embodiments of the Local Software 310 may include, but are not limited to:

1. A component of a completely custom application, such as an application designed for a mobile platform, tablet, wearable device, or other, similar personal computing environments;
2. A multi-component system of applications that interact and operate to deliver the same functionality of a single browser add-on or extension; examples include a desktop application that facilitates User authentication and hardware communications and interacts with a web browser add-on or extension that facilitates interactivity with a web page, multimedia, and the Web Infrastructure 120; and
3. A fully-enclosed web application that facilitates all functions across a network via a web server; said Web Server 130 may exist in various forms, such as on a standalone hardware device, on the Local Hardware Device 200, or as a component within a cloud infrastructure environment.

The disclosed systems and methods are best understood when described in an illustrative usage context. To this end, the paragraphs that follow describe three illustrative embodiments, wherein for each embodiment the multimedia event's hardware instruction set is interpreted by a different component.

First Illustrative Embodiment

FIG. 3 shows a beginning-to-end illustrative process view of the disclosed systems and methods, wherein the instruction set processing occurs within the Local Software 310.

A User connects the Local Hardware Device 200 to the Local Computer 100 via the Local Hardware Device's 200 Communication Device 210. Once the Local Hardware Device 200 is connected to the Local Computer 100, the User launches the Local Software 310. The Local Software 310 will prompt the User to log in to their account; if an account has not been established, the User is prompted to create a new account. Credentials are passed from the Local Software 310 to the Web Infrastructure 120, which validates the authentication attempt.

Once authenticated, the Local Software 310 detects the Local Hardware Device 200, requests the Local Hardware Device's 200 unique hardware ID, and verifies with the Web Infrastructure 120 that the specific Local Hardware Device 200 is associated with a currently-authenticated account. If so, the Local Software 310 initiates the Local Hardware Device 200. When initialized, the Local Hardware Device 200 is ready to receive instructions from the Local Software 310 and the User is notified that the Local Hardware Device 200 is ready for use.

If the unique hardware ID is not associated with an authenticated account, the Web Infrastructure 120 checks to see if it is associated with another account. If it is, the Local Software 310 prompts the User to log in to the correct account to be able to use the connected device; in at least some illustrative embodiments, the usage of simultaneous multiple account logins may be allowed to permit the usage of multiple devices. If the unique hardware ID is not associated with any accounts, the User is prompted to register the unique hardware ID with their account. Once the Local Hardware Device 200 is registered or the User is authenticated to the correct account, the Local Software 310 verifies again with the Web Infrastructure 120 that the specific Local Hardware Device 200 is associated with a currently-authenticated account. The Local Software 310 then initiates the Local Hardware Device 200 and notifies the User that the Local Hardware Device 200 is ready for use.

The User then uses the Local Software 310 to navigate to a web page. Each time a new web page is loaded, the Local Software 310 parses the page to detect supported media. If supported media is not found, the Local Software 310 does nothing; if supported media is found, the Local Software 310 detects and sends the media file information to the Web Infrastructure 120. The Web Infrastructure 120 queries the Database Infrastructure 140 to determine if a hardware instruction set exists for the detected media. If an instruction set is not found, the Local Software 310 designates the media as "not supported;" if an instruction set is found, the Local Software 310 designates the media as "supported & ready for play," and the instruction set file is downloaded to the Local Software 310 for parsing and playback. The designation of "supported & ready for play" and "not supported" may exist as a visual indicator on or near the media file within the web page.

The User then plays the media. The Local Software 310 reads the current playback time of the media and sends the hardware instruction set to the Local Hardware 200 synchronous to the current media playback time. The hardware instruction set contains time flags to mark the accurate playback time of the Haptic Feedback Capable Components 240; the Local Software 310 monitors the accurate playback time of the media event and uses both pieces of information to maintain synchronization of the Haptic Feedback Capable Components 240 on the Local Hardware 200 and the media. If the current playback time of the media is adjusted by the User, the Local Software 310 uses the updated current playback time and the time flags in the hardware instruction set to re-establish synchronization based on the adjustment made by the User. The playback time of the media may be access from the media player, the operating system, the media file, or any other location from which a playback time may be accessed.

In another embodiment, the Local Software 310 includes a computer vision component adapted to analyze the content of the media. The computer vision component may determine a playback time of the media based on the analyzed content. In some embodiments, the computer vision component may analyze one or more frames of the media content, and analyzed frames may be used as an index to the media to determine the playback time. In this manner, the playback time may be either a time index or another index to the media content capable of being associated with the instructions to synchronize the hardware instructions with the playback of the media content. The computer vision component may be a software component stored in memory and executed on a processor of a haptic feedback system.

When the Local Hardware 200 receives the instructions from the Local Software 310, the Local Hardware 200 interprets said instructions and generates corresponding electrical signals that are sent to the Haptic Feedback Capable Components 240, resulting in the production of physical haptic feedback output that is experienced by the User.

When the User stops the playback of the media the Local Software stops the playback of the instruction set to the Local Hardware 200, which stops sending electrical signals to the Haptic Feedback Capable Components 240. The system is then ready for navigation to the next web page, or, if the User disconnects the Local Hardware 200, all memory is cleared and the Local Software 310 is rendered dormant until the Local Hardware 200 is connected again.

Second Illustrative Embodiment

FIG. 4 shows a beginning-to-end process view of the disclosed systems and methods, wherein the instruction set processing occurs within the Local Hardware 200.

A User connects the Local Hardware Device 200 to the Local Computer 100 via the Local Hardware Device's 200 Communication Device 210. Once the Local Hardware Device 200 is connected to the Local Computer 100, the User launches the Local Software 310. The Local Software 310 prompts the User to log in to their account; if an account has not been established, the User is prompted to create a new account. Credentials are passed from the Local Software 310 to the Web Infrastructure 120, which validates the authentication attempt.

Once authenticated, the Local Software 310 detects the Local Hardware Device 200, requests the Local Hardware Device's 200 unique hardware ID, and verifies with the Web Infrastructure 120 that the specific Local Hardware Device 200 is associated with a currently-authenticated account. If so, the Local Software 310 initiates the Local Hardware Device 200. When initialized, the Local Hardware Device 200 is ready to receive current media playback times from the Local Software 310 and the User is notified that the Local Hardware Device 200 is ready for use.

If the unique hardware ID is not associated with an authenticated account, the Web Infrastructure 120 checks to see if it is associated with another account. If it is, the Local Software 310 prompts the User to log in to the correct account to be able to use the connected device; in at least some illustrative embodiments, the usage of simultaneous multiple account logins may be allowed to permit the usage of multiple devices. If the unique hardware ID is not associated with any accounts, the User is prompted to register the unique hardware ID with their account. Once the Local Hardware Device 200 is registered or the User is authenticated to the correct account, the Local Software 310 verifies again with the Web Infrastructure 120 that the specific Local Hardware Device 200 is associated with a currently-authenticated account. The Local Software 310 then initiates the Local Hardware Device 200 and notifies the User that the Local Hardware Device 200 is ready for use.

The User then uses the Local Software 310 to navigate to a web page. Each time a new web page is loaded, the Local Software 310 parses the page to detect supported media. If supported media is not found, the Local Software 310 does nothing; if supported media is found, the Local Software 310 detects and sends the media file information to the Web Infrastructure 120. The Web Infrastructure 120 queries the Database Infrastructure 140 to determine if a hardware instruction set exists for the detected media. If an instruction set is not found, the Local Software 310 designates the media as "not supported;" if an instruction set is found, the Local Software 310 designates the media as "supported & ready for play," and the instruction set file is passed through the Local Software 310 to the Local Hardware 200 for parsing and playback. The designation of "supported & ready for play" and "not supported" may exist as a visual indicator on or near the media file within the web page.

The User then plays the media. The Local Software 310 reads the current playback time of the media and sends that information to the Local Hardware 200. The hardware instruction set contains time flags to mark the accurate playback time of the Haptic Feedback Capable Components 240; the Local Software 310 monitors the accurate playback time of the media, and the Local Hardware 200 uses the media's current playback time and the time flags within the hardware instruction set to maintain synchronization of the Haptic Feedback Capable Components 240 and the media. If the current playback time of the media is adjusted by the User, the Local Software 310 sends the updated current playback time to the Local Hardware 200, which uses the time flags in the hardware instruction set to re-establish synchronization based on the adjustment made by the User. In other embodiments, the playback time may be determined by analyzing the content using computer vision as discussed above.

When the Local Hardware 200 receives the current playback times from the Local Software 310, the Local Hardware 200 interprets said instructions and generates corresponding electrical signals that are sent to the Haptic Feedback Capable Components 240, resulting in the production of physical haptic feedback output that is experienced by the User.

When the User stops the playback of the media the Local Software stops the playback of the hardware instruction set and sends a stop signal to the Local Hardware 200, which stops sending electrical signals to the Haptic Feedback Capable Components 240. The system is then ready for navigation to the next web page, or, if the User disconnects the Local Hardware 200, all memory is cleared and the Local Software 310 is rendered dormant until the Local Hardware 200 is connected again.

Third Illustrative Embodiment

FIG. 5 shows a beginning-to-end process view of the disclosed systems and methods, wherein the instruction set processing occurs within the Web Infrastructure 120.

A User connects the Local Hardware Device 200 to the Web Infrastructure 120 via the Local Hardware Device's 200 Communication Device 210. Once the Local Hardware Device 200 is connected to the Web Infrastructure 120, the User will launch the Local Software 310. The Local Software 310 receives confirmation from the Web Infrastructure 120 that the Local Hardware is connected and prompts the User to log in to their account; if an account has not been established, the User is prompted to create a new account. Credentials are passed from the Local Software 310 to the Web Infrastructure 120, which validates the authentication attempt.

Once authenticated, the Web Infrastructure 120 detects the Local Hardware Device 200, requests the Local Hardware Device's 200 unique hardware ID, and verifies that the specific Local Hardware Device 200 is associated with a currently-authenticated account. If so, the Web Infrastructure 120 initiates the Local Hardware Device 200. When initialized, the Local Hardware Device 200 is ready to receive instructions from the Web Infrastructure 120 and the User 300 is notified that the Local Hardware Device 200 is ready for use.

If the unique hardware ID is not associated with an authenticated account, the Web Infrastructure 120 checks to see if it is associated with another account. If it is, the Local Software 310 prompts the User to log in to the correct account to be able to use the connected device; in at least some illustrative embodiments, the usage of simultaneous multiple account logins may be allowed to permit the usage of multiple devices. If the unique hardware ID is not associated with any accounts, the User is prompted to register the unique hardware ID with their account. Once the Local Hardware Device 200 is registered or the User is authenticated to the correct account, the Local Software 310 verifies again with the Web Infrastructure 120 that the specific Local Hardware Device 200 is associated with a currently-authenticated account. The Local Software 310 then notifies the Web Infrastructure 120 to initiate the Local Hardware Device 200 and the User is notified that the Local Hardware Device 200 is ready for use.

The User then uses the Local Software 310 to navigate to a web page. Each time a new web page is loaded, the Local Software 310 parses the page to detect supported media. If supported media is not found, the Local Software 310 does nothing; if supported media is found, the Local Software 310 detects and sends the media file information to the Web Infrastructure 120. The Web Infrastructure 120 queries the Database Infrastructure 140 to determine if a hardware instruction set exists for the detected media. If an instruction set is not found, the Local Software 310 designates the media as "not supported;" if an instruction set is found, the Local Software 310 designates the media as "supported & ready for play," and the Web Infrastructure 120 retrieves the instruction set file for parsing and playback. The designation of "supported & ready for play" and "not supported" may exist as a visual indicator on or near the media file indicator (e.g., an icon) within the web page.

The User then plays the media. The Local Software 310 reads the current playback time of the media and sends that information to the Web Infrastructure 120. The hardware instruction set contains time flags to mark the accurate playback time of the Haptic Feedback Capable Components 240; the Local Software 310 monitors the accurate playback time of the media, and the Web Infrastructure 120 uses the media's current playback time and the time flags within the hardware instruction set to maintain synchronization of the Haptic Feedback Capable Components 240 and the media. If the current playback time of the media is adjusted by the User, the Local Software 310 sends the updated current playback time to the Web Infrastructure 120, which uses the time flags in the hardware instruction set to re-establish synchronization based on the adjustment made by the User 300. In other embodiments, the playback time may be determined by analyzing the content using computer vision as discussed above.

When the Local Hardware 200 receives the current instructions from the Web Infrastructure 120, the Local Hardware 200 interprets said instructions and generates corresponding electrical signals that are sent to the Haptic Feedback Capable Components 240, resulting in the production of physical haptic feedback output that is experienced by the User.

When the User stops the playback of the media event, the Local Software sends a stop signal to the Web Infrastructure 120. Web Infrastructure 120 in turn sends a stop signal to the Local Hardware 200, which stops sending electrical signals to the Haptic Feedback Capable Components 240. The system is then ready for navigation to the next web page, or, if the User disconnects the Local Hardware 200, all memory is cleared and the Local Software 310 is rendered dormant until the Local Hardware 200 is connected again.

In an alternate embodiment, all of the Local Software 310 functions may exist entirely within the Web Infrastructure 120, and the User may access the disclosed system via a web browser.

Media Appliance

Figure 6:
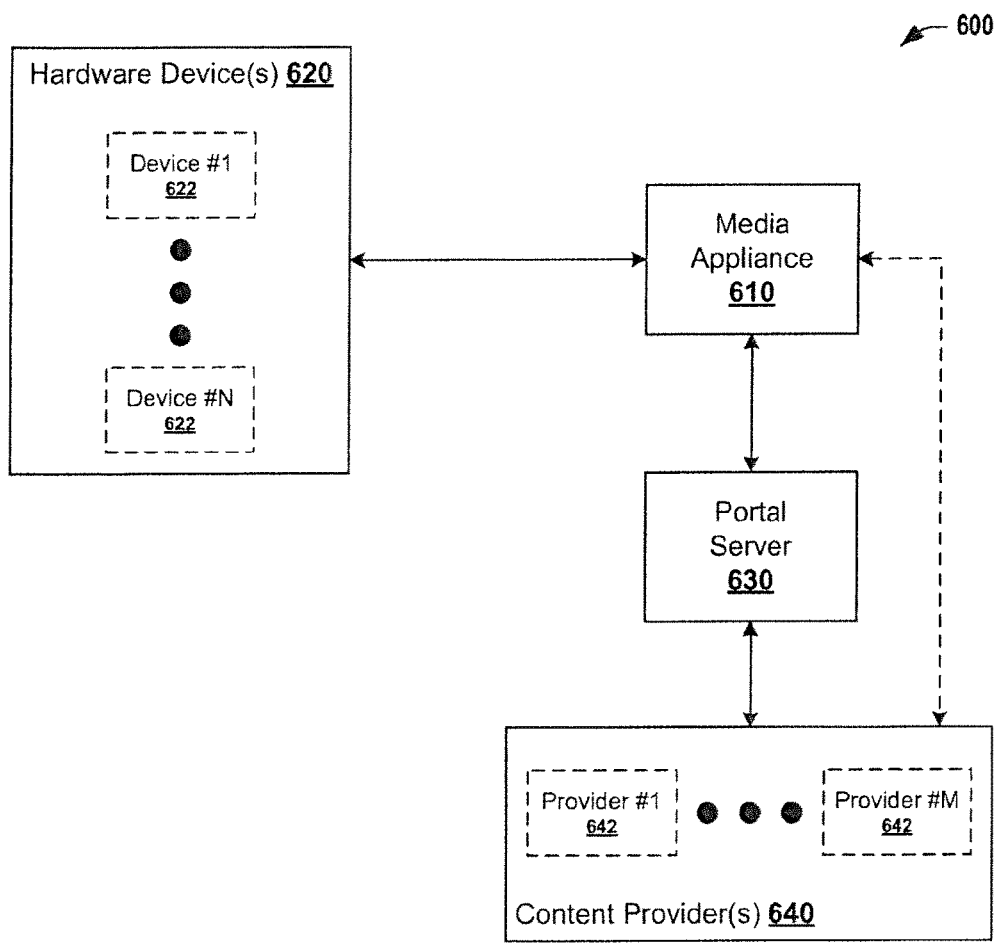
FIG. 6 illustrates a block diagram of a system that includes an exemplary, non-limiting media appliance.

FIG. 6 illustrates an exemplary, non-limiting system 600 that includes a media appliance 610 in accordance with one or more aspects. Media appliance 610 can be a computing device configured to interact with a portal server 630 and a set of hardware devices 620. In one example, media appliance 610 can be a computing device configured to be coupled to a display device (e.g. a television, projector, computer monitor, etc.). In another example, media appliance 610 can include an integrated display device. For instance, media appliance 610 can be a portable media playback device. Alternatively, media appliance 610 can be a laptop or desktop computer having an application that, when executed by the appliance 610, interacts with the portal server 630 and the set of hardware devices 620 according to the aspects described herein. Further, media appliance 610 can be a mobile device (e.g., a tablet, a smartphone, a portable media device, etc.) executing an application to perform aspects described herein.

A user of media appliance 610 can browse content from content providers 640 via the portal server 630. As shown in FIG. 6, content providers 640 can include one or more individual providers 642 such as provider #1 through provider #M, where M is an integer greater than or equal to one. Content from content providers 640 can be multimedia content such as movies, television shows, streaming video, video games, interactive media, or other streamable or downloadable multimedia content. Portal server 630 can organize content from various content providers 640 into a plurality of channels selectable by the user for consumption via the media appliance 610. A channel from the plurality of channels can include content group according to one or more criteria. For instance, the channel can include content from a particular provider 642. In another example, the channel can include content drawn to a specific genre, featuring a specific artist or performer, targeted to a particular audience, related to a specific interest, receiving a threshold critic rating, or a combination of the foregoing. Accordingly, the channel can incorporate content from one or more individual providers 642.

The user can subscribe to the channel and receive the associated content on a subscription basis. For instance, the user can consume all content associated with the channel via the media appliance 610 so long as a subscription fee is paid. In another example, individual content items can be acquired on a pay-per basis such as a single payment for unlimited viewing, a payment for a single viewing, or a rental charge for unlimited viewings until released. Further, instead of individual content items, a bundle or season of content items can be acquired as described above.

In an aspect, portal server 630 can deliver web-based information to media appliance 610 for output to the user to enable browsing, purchase, and/or streaming of content from content providers 640. The web-based information can include styling according to a form of media appliance 610. For instance, for mobile device-based implementation of media appliance 610, the web-based information can include styling to display the information in a suitable format for mobile browsing. For a media appliance 610 coupled to an external display, the styling can transform the information to a format suitable for interaction via a remote control for example. In yet another aspect, the portal application 620 can deliver information in a general form such that the media appliance 610 generates a native user interface that incorporates the information. Further, media appliance 610 can also interact directly with content providers 640 to receive available content, select content, playback content, etc.

As shown in FIG. 6, media appliance 610 interacts with hardware devices 620, which can be a set of one or more devices 622 such as device #1 through device #N, where N is an integer greater than or equal to one. Particularly, media appliance 610 interacts with hardware devices 620 during playback of media or content. As described above in other embodiments, hardware devices 620 can include various components or features activated responsive to instructions or signals. For instance, hardware devices 620 can include haptic devices, drones, robotic elements, electrically-driven mechanical components, audio-producing components, visual elements (e.g., displays, lighting features, etc.), or the like which can be selectively activated and controlled via instructions. As described above, an instruction set for a particular device 622 and a particular content item can be separately stored, managed, retrieved, and executed (played back) from the content item. Media appliance 610, during playback of the content, ensures synchronization between the content and the instructions such that results exhibited in the hardware devices 620 are coordinated with content playback.

In an aspect, media appliance 610 can operate multiple hardware devices 622 in parallel during playback of a specific content item. For instance, a user can utilize a subset of the set of hardware devices 620 supported in connection with playback of a content item. The media appliance 610 can generate, retrieve, or otherwise acquire instruction sets associated with the content item. The instruction sets include a plurality of instruction sets respectively associated with the subset of hardware devices 620 utilized by the user. The media appliance 610 can transmit instructions or signals to the subset of hardware devices 620, based on the respective instruction sets, in synchronization with playback of the content item.

Figure 7:
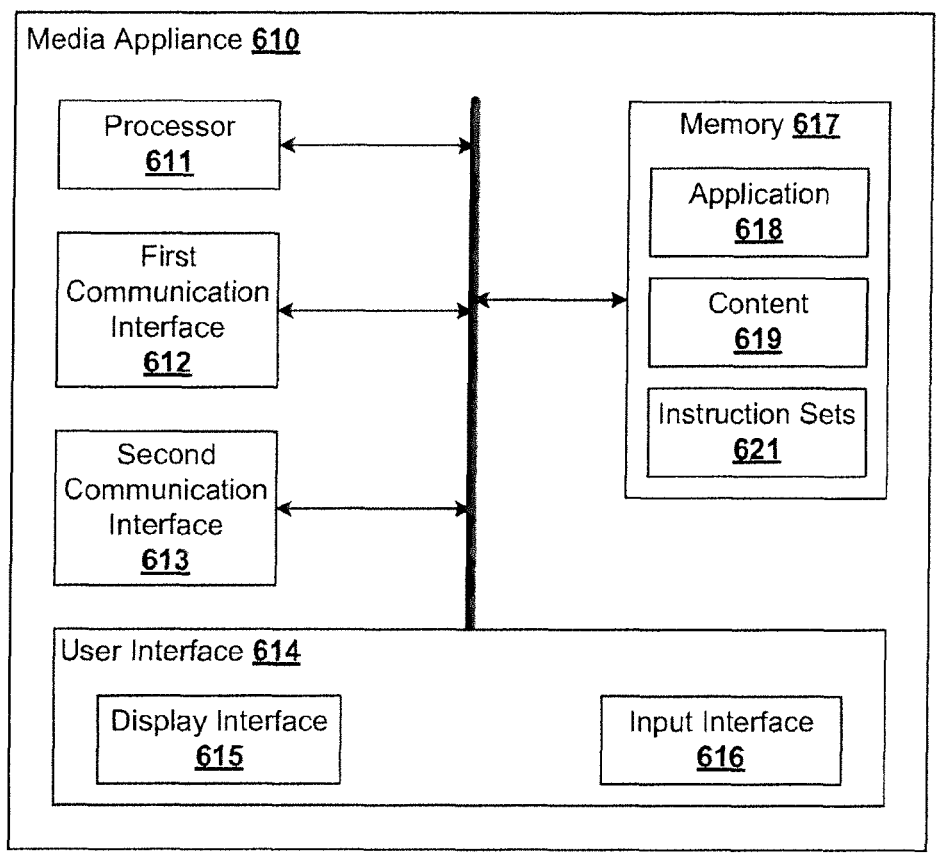
FIG. 7 illustrates a block diagram of the media appliance.

Turning to FIG. 7, illustrated is a non-limiting, exemplary embodiment of media appliance 610 according to one or more aspects. Media appliance 610 includes a processor 611 configured to execute computer-executable instructions such as instructions composing application 618. Such computer-executable instructions can be stored on one or more computer-readable media including a non-transitory, computer-readable storage medium such as memory 617 of media appliance 610. The memory 617 can also store content 619 retrieved or downloaded from portal server 630 or content providers 640, and/or instruction sets 621 retrieved from a separate location (separate storage of portal server 630 or other remote storage) or generated by application 618.

Media appliance 610 includes a first communication interface 612 and a second communication interface 613. As schematically depicted and described herein, a "communication interface" refers to a logical interface through which communication between at least two entities is established and conducted. The communication interface incorporates an address, identifier, frequency, etc. to which transmission can be directed for reception by the entity utilizing the interface. The address, identifier, or frequency may also serve to identify an origin for transmission from the interface. As a logical interface, the communication interface can include one or more protocols enabling the communication. These protocols can be layered (e.g., according to the OSI model) as one of ordinary skill in the art would appreciate. Further, these protocols can vary depending a medium of transmission. For example, the communication interface can utilize a wired or wireless medium. To this end, as utilized herein, the communication interface also includes physical interfaces and transmit/receive processing chains to implement the communication of the medium. For example, the communication interface can include physical wired or wireless interfaces such as, but not limited to, a USB interface, a serial interface, a WiFi interface, a short-range RF interface (Bluetooth), an infrared interface, a near-field communication (NFC) interface, an Ethernet interface, a fiber optic interface, a cellular radio interface, a satellite interface, etc.

According to one example, first communication interface 612 is utilized by the media appliance 610 to communicate with portal server 630, content providers 640, and/or another entity storing instruction sets. Accordingly, first communication interface 612 can be a network or Internet interface. Second communication interface 613 can be utilized by the media appliance 610 to communicate with hardware devices 620. Accordingly, the second communication interface 613 can be a short-range RF interface (e.g. Bluetooth), a wired interface (e.g. USB), or a combination thereof (i.e. capable of either so as to enable use while charging for example).

While shown in FIG. 7 as separate communication interfaces, it is to be appreciated that the first communication interface 612 and the second communication interface 613 can be a single communication interface. That is, the first communication interface 612 and the second communication interface 613 can overlap in terms of protocol or physical interface usage. For example, the first communication interface 612 can employ an IP-based communication via WiFi to communicate with portal server 630. The second communication interface 613 can also utilized an IP-based WiFi communication with hardware devices 620. That is, the media appliance 610 can communicate with hardware devices 620 via a local wireless network. A single physical wireless adapter can be employed to conduct both communications.

Media appliance 610 further includes a user interface 614 configured to obtain input from a user and output display information to the user. User interface 614 can include a display interface 615 and an input interface 616. In one example, the display interface 615 can include a digital visual interface (DVI), a high-definition multimedia interface (HDMI), an optical audio interface, a video graphics array (VGA) interface, or substantially any audio/video interface. Accordingly, the media appliance 610 can be coupled to a display, speakers, an entertainment system, an audio/visual receiver, a television, etc. via the display interface 615. Input interface 616 can include a wired or wireless adapter for an input device such as a keyboard, a pointing device (e.g. mouse, touchpad), or a remote control. Further, it is to be appreciated that the user interface 614 can be provided by a single device. For instance, a touch display or a touchscreen of a mobile device serves to display output and capture input.

Application 618 is configured to initiate communication with portal server 630 and/or content providers 640 to obtain information related to available content. Application 618 can also authenticate a user to verify access to the portal server 630 is authorized. Application 618 can display the available content as channels or other groups for selection by the user. Application 618 further facilitates selection, purchase, download, or streaming of content from among the available content.

In a further aspect, application 618 performs playback of content 619. As discussed herein, playback of content 619 can involve interactions with hardware devices 620. Accordingly, the application 618 can detect available hardware devices 620, i.e. devices paired with media appliance 610 or otherwise active and accessible in an environment of media appliance 610. Having identified available hardware devices 620, application 618 retrieves appropriates instruction sets 621 corresponding to content 619 and suitable for the hardware devices 620 detected. Application 618 synchronizes the instructions with playback of content 619 as described herein.

Figure 8:
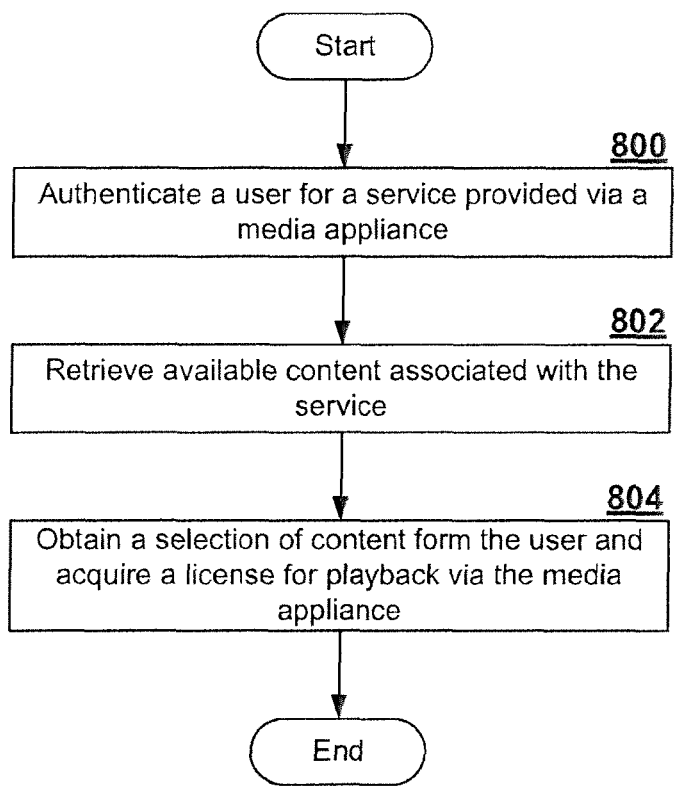
FIGS. 8 and 9 illustrates flow diagrams of an exemplary, non-limiting embodiment for utilizing one or more hardware devices with a media appliance having access to content from one or more content providers.

Turning to FIG. 8, an exemplary, non-limiting method for retrieving content via a service is depicted. The method can be performed by the media appliance 610, for example. At 800, a user is authenticated with a service provided via a media appliance. At 802, available content associated with the service is retrieved. For instance, the media appliance can communicate with a portal server delivering web-based information. Alternatively, the media appliance can communicate with content providers directly and aggregate respective content available from disparate providers. At 804, a selection of content is obtained from the user and a license for playback of the content selected is acquired.

Figure 9:
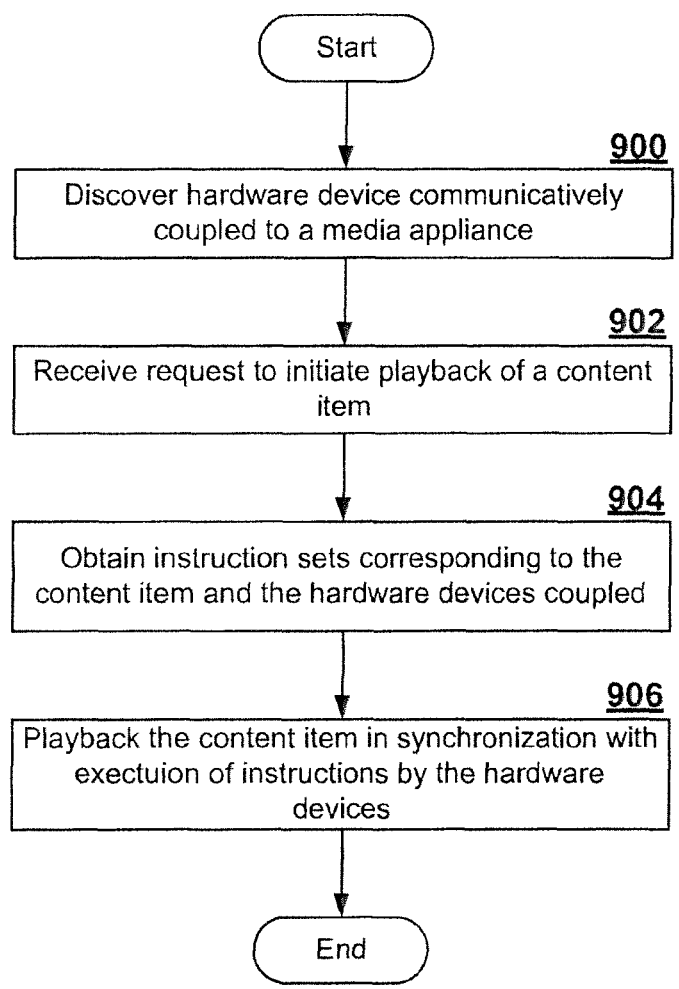

FIG. 9 illustrates a method for playback of content via the media appliance via one or more aspects. At 900, one or more hardware devices communicatively coupled to the media appliances are discovered. At 902, a request to initiate playback of a content item is received. At 904, instruction sets are obtained. The instruction sets correspond to the content item and the hardware devices coupled to the media appliance. At 906, playback of the content item is performed in synchronization with execution, by the hardware devices, of instructions from the instruction sets.

In yet further embodiments, the disclosed systems and methods are configured to provide tactile sensations for video game. When a video game is played, the video game controller provides instructions that the disclosed system may interpret into commands for one or more connected hardware devices. The instruction set generated by the video game controller may be pre-programmed or generated in response to user-trigger events within the video game. While a video game controller may generate instructions for a given hardware device (such as a device sold or licensed by the video game manufacturer), the disclosed system is configured to receive the instruction from the video game controller, and further configured to generate instructions or one or more hardware devices based upon the received instructions. In this manner, the disclosed system enables multiple different hardware devices to be used in combination with a given video game.

While various embodiments of the disclosed system refer to specific wireless communication techniques, the system may be used with two or more communication techniques in the same appliance. For example, it may be desired to incorporate two or more of RF, WiFi, and Bluetooth into a given appliance in order to provide multiple connection methods. As one illustration, a media appliance in accordance with the present disclosure may connect to a server using a WiFi connection, and also be configured to communicate with hardware devices using either a proprietary RF signal, or a Bluetooth signal, depending upon the requirements of the specific hardware device. The disclosed system may be particularly well suited for use with hardware devices, including certain virtual reality devices, such as the Oculus Rift, Sony VR, Steam VR, and HTC Vive.

Further aspects of the disclosed systems and methods are also disclosed that may be used individually or in combination with the illustrative embodiments previously discussed. In one embodiment, a haptic feedback system is disclosed that includes a processor coupled to a memory and at least one haptic feedback device in communication with the processor. The haptic feedback system may also include a presentation device adapted to present the media content to the user. The processor is configured to execute computer executable instructions, including synchronizing media content loaded on a first computer with instructions received from a second computer. As detailed in the embodiments, above, the media content may be supported media content identified on a particular webpage. In one example, the processor is configured to identify the uniform resource locator of a particular webpage, and the URL is used to identify the media content for the purpose of determining whether the particular media content is supported by the system, i.e. whether the media content has a corresponding instruction set. In other examples, media content may be identified by a serial number or other unique indicia accessible to the system that may be correlated to an instruction set for the media content. In yet other embodiments, the system may interface with a media player and receive information identifying the media content from the media player, such as through a programmatic interface.

In another aspect, the haptic feedback system includes at least one haptic feedback device that includes a hardware identification. In embodiments, the system uses the hardware identification in combination with the identification of the media content to determine whether an instruction set exists for a given media content and haptic feedback device. In this manner, the presently disclosed systems and methods may provide instructions for multiple different haptic devices capable of use with a given media content. In addition, instructions for new or additional haptic devices may be added to the system, reducing the costs associated with supporting multiple devices. In yet other embodiments, the instruction set may contain multiple instruction sets associated with a media content or a haptic device, which are used in combination to generate the desired operation. Because the instructions are stored on a different computer than the media content, a wider variety of media and haptic devices may be supported than was possible with prior integrated systems that included haptic commands embedded in the media content.

The identification of the haptic device may occur at various times during operation of the system. In one example, when an internet browser is launched, the haptic device is automatically detected and a determination made as to whether the device is supported. In other embodiments, a user is permitted to provide the identification of the haptic device. In yet other embodiments, the haptic device may be a plug-and-play device, which is automatically identified when connected to a computer. Other methods of identifying the haptic device are also possible and are contemplated for use with the presently disclosed systems and method.

In various embodiments, the haptic feedback system synchronizes the media content with the instructions. The synchronization may be achieved using the current playback time of the media content as previously discussed, which may be accessed from the media player. In some embodiments, the media content may be parsed into scenes or frames of a defined duration, and the instructions synchronized to such scenes or frames as desired. Either prior to or after synchronization with the media content, the instructions are converted into one or more electrical signals used to control the at least one haptic feedback device. One of ordinary skill in the art will appreciate that the transformation of instructions into electrical signals may be performed in a variety of ways using conventional computing equipment, including processors and hardware drivers located in a computer, in a given haptic device or allocated between multiple components. In any event, the at least one haptic device is configured to receive the one or more electrical signals and to provide physical stimulations to a user accessing the content in synchronization with the playback of the media content. In embodiments, haptic device may be immediately responsive to the electrical signals, or alternatively, the haptic device may store the electrical signals as instructions to be applied when triggered by the haptic feedback system.

The haptic feedback systems and methods presently disclosed may be applied in a wide range of applications. For example, the haptic feedback device may be a game controller adapted for use with an online video game system. The game controller may provide physical stimulation corresponding to actions occurring within the game content to enhance the user experience. In other embodiments, the haptic device may by a sexually oriented hardware device or other entertainment related device. In yet other embodiments, the haptic feedback system may be applicable to training or education applications, such as surgical training simulators that benefit from physical stimulations to simulate real life operating procedures. These and other applications will be apparent to persons of ordinary skill in the art and these examples are provided solely to help illustrate the breadth of applications for the haptic feedback systems and methods.

Numerous other modifications, equivalents, and alternatives, will become apparent to those skilled in the art once the above disclosure is fully appreciated. For example, while the disclosed embodiments are described within the context of a system used to augment a multimedia event for entertainment purposes, other embodiments may include systems used in the rehabilitation of patients suffering from, for example, reduced physical and/or sexual function such as that caused by the side-effects of diabetes, traumatic brain injuries, spinal cord injuries and/or prostate-related issues. It is intended that the following claims be interpreted to embrace all such modifications, equivalents, and alternatives where applicable.

What is claimed is:

1. A media tactile augmentation system for interfacing with a plurality of content providers, comprising:
 a. a portal server, the portal server in electronic communication with the plurality of content providers, the portal serving having access to a plurality of instruction sets corresponding to content items offered by the plurality of content providers, the portal server being accessible by at least one media appliance, the portal server being configured to:
  1. provide content information from the plurality of content providers to a media appliance;
  2. identify instruction sets corresponding to a content item requested by a media appliance;
  3. provide at least a portion of the instruction set and content item to the requesting media appliance; and
 b. at least one media appliance, comprising:
  1. a processor coupled to a memory storing computer-executable instructions for a local application for augmenting content playback;
  2. a first communication interface configured to communicate with the portal server;
  3. a communication interface configure to communicate with at least one haptic hardware device externally located with respect to the media appliance; and
  4. a display interface configured to output display information associated with content playback to a display.

2. The media tactile augmentation system of claim 1, wherein each of the plurality of instruction sets comprises a media content instruction set and a haptic device instruction set which are used in combination to generate the desired operation.

3. The media tactile augmentation system of claim 2, wherein the haptic device instruction set corresponds to the at least a portion of the instruction set provided to the requesting media device.

4. The media tactile augmentation system of claim 2, wherein multiple haptic device instruction sets correspond to a single media content instruction set.

5. The media tactile augmentation system of claim 1, wherein the local application, when executed by the processor of the media appliance, configures the processor to:
  a. identify a media event selected for playback;
  b. identify one or more haptic hardware devices communicatively coupled with the media appliance;
  c. send a request to the web interface of the haptic instruction set infrastructure requesting one or more instructions sets corresponding to the identified media event and to the identified haptic hardware device;
  d. receive the one or more instructions sets
  e. initiate playback of the media event; and
  f. synchronize execution of instructions, from the one or more instructions sets, by the set of hardware devices with the playback of the media event.

6. The media tactile augmentation system of claim 1, wherein each of the haptic hardware instruction sets corresponding to a given supported media event have the same time flags.

7. The media tactile augmentation system of claim 1, wherein supported media events are not stored on haptic instruction set infrastructure.

8. The media tactile augmentation system of claim 1, wherein the media appliance comprises a mobile device and the local application comprises a mobile application.

9. The media tactile augmentation system of claim 1, wherein the media appliance comprises a local computer.

10. The media tactile augmentation system of claim 1, wherein the media appliance has a separate display.

11. The media tactile augmentation system of claim 1, wherein the display comprises a virtual or augmented reality headset.

12. The media tactile augmentation system of claim 1, wherein the content information comprises at least one link to content hosted by at least one of the plurality of content providers.

13. The media tactile augmentation system of claim 1, wherein the content information comprises content hosted by the portal server.

14. A media appliance, comprising:
  a processor coupled to a memory storing computer-executable instructions for an application for augmenting content playback;
  a communication interface configure to communicate with a set of hardware devices externally located with respect to the media appliance; and
  a display interface configured to output display information associated with content playback to a display,
  wherein the application, when executed by the processor, configures the processor to:
    identify a content item selected for playback;
    determine the set of hardware devices communicatively coupled with the media appliance;
    acquire one or more instructions sets corresponding to the content item, respective instructions sets being respectively associated with respective hardware devices of the set of hardware devices;
    initiate playback of the content item; and
    synchronize execution of instructions, from the one or more instructions sets, by the set of hardware devices with the playback of the content item.

* * * * *